United States Patent
Harutyunyan

(10) Patent No.: US 11,325,833 B2
(45) Date of Patent: May 10, 2022

(54) COMPOSITE YARN AND METHOD OF MAKING A CARBON NANOTUBE COMPOSITE YARN

(71) Applicant: HONDA MOTOR CO., LTD., Tokyo (JP)

(72) Inventor: Avetik Harutyunyan, Columbus, OH (US)

(73) Assignee: HONDA MOTOR CO., LTD., Tokyo (JP)

(*) Notice: Subject to any disclaimer, the term of this patent is extended or adjusted under 35 U.S.C. 154(b) by 311 days.

(21) Appl. No.: 16/446,389

(22) Filed: Jun. 19, 2019

(65) Prior Publication Data

US 2020/0399129 A1 Dec. 24, 2020
US 2021/0316991 A9 Oct. 14, 2021

Related U.S. Application Data

(60) Provisional application No. 62/813,516, filed on Mar. 4, 2019.

(51) Int. Cl.
*C01B 32/16* (2017.01)
*C01B 32/168* (2017.01)
(Continued)

(52) U.S. Cl.
CPC ............ *C01B 32/16* (2017.08); *C01B 32/168* (2017.08); *D01F 9/12* (2013.01); *D02G 3/02* (2013.01); *B82Y 30/00* (2013.01); *B82Y 40/00* (2013.01)

(58) Field of Classification Search
CPC ..... C01B 32/16; C01B 32/168; C01B 32/158; C01B 32/159; C01B 32/162;
(Continued)

(56) References Cited

U.S. PATENT DOCUMENTS 3,513,034 A 5/1970 Fischbach et al.
3,772,084 A 11/1973 Scholle
(Continued)

FOREIGN PATENT DOCUMENTS

CN 102482098 A 5/2012
CN 102593436 A 7/2012
(Continued)

OTHER PUBLICATIONS

Zhang, et al., Porous, Platinum Nanoparticle-Absorbed Carbon Nanotube Yarns for Efficient Fiber Solar Cells, ACS Nano 2012; 6(8): 7191-7198 with Supporting Information (Year: 2012).*
(Continued)

*Primary Examiner* — Daniel C. McCracken
(74) *Attorney, Agent, or Firm* — ArentFox Schiff LLP; Mark Duell

(57) ABSTRACT

A method of making a carbon nanotube composite yarn, the method including growing floating carbon nanotubes in a reactor, forming a mat of carbon nanotubes from the floating carbon nanotubes, a deposition step including depositing secondary particles on at least a portion of the mat of carbon nanotubes to provide a carbon nanotube composite mat, and a densification step including densifying the carbon nanotube composite mat to provide a carbon nanotube composite yarn.

19 Claims, 8 Drawing Sheets

(51) Int. Cl.
- *D02G 3/02* (2006.01)
- *D01F 9/12* (2006.01)
- *B82Y 40/00* (2011.01)
- *B82Y 30/00* (2011.01)

(58) Field of Classification Search
CPC ..... C01B 32/164; C01B 32/166; C01B 32/17; C01B 32/172; C01B 32/174; C01B 32/176; C01B 32/178; C01B 2202/00; C01B 2202/02; C01B 2202/04; C01B 2202/06; C01B 2202/08; C01B 2202/10; C01B 2202/20; C01B 2202/22; C01B 2202/24; C01B 2202/26; C01B 2202/28; C01B 2202/30; C01B 2202/32; C01B 2202/34; C01B 2202/36; D02G 3/02; D02G 3/16; D01F 9/12; D01F 11/12; D01F 9/127; D01F 9/1271; D01F 9/1272; D01F 9/1273; D01F 9/1274; D01F 9/1275; D01F 9/1276; D01F 9/1277; D01F 9/1278; D01F 9/133; B82Y 40/00; B82Y 30/00; D10B 2101/122
See application file for complete search history.

(56) References Cited

U.S. PATENT DOCUMENTS

| | | |
|---|---|---|
| 5,985,175 A | 11/1999 | Fan et al. |
| 7,094,385 B2 | 8/2006 | Beguin et al. |
| 7,288,870 B2 | 10/2007 | Mitcham et al. |
| 7,348,101 B2 | 3/2008 | Gozdz et al. |
| 7,622,059 B2 | 11/2009 | Bordere et al. |
| 7,999,028 B2 | 8/2011 | Lin et al. |
| 8,083,905 B2 | 12/2011 | Choi et al. |
| 8,084,158 B2 | 12/2011 | Chu et al. |
| 8,293,204 B2 | 10/2012 | Khodadadi et al. |
| 8,435,676 B2 | 5/2013 | Zhamu et al. |
| 8,465,871 B2 | 6/2013 | Juzkow et al. |
| 8,628,747 B2 | 1/2014 | Zachariah et al. |
| 8,703,092 B2 | 4/2014 | Ziegler |
| 8,787,001 B2 | 7/2014 | Fleischer et al. |
| 8,825,178 B2 | 9/2014 | Feng et al. |
| 8,883,113 B2 | 11/2014 | Richter et al. |
| 8,974,960 B2 | 3/2015 | Manthiram et al. |
| 8,986,872 B2 | 3/2015 | Lev et al. |
| 9,034,421 B2 | 5/2015 | Mikhaylik et al. |
| 9,167,736 B2 | 10/2015 | Shah et al. |
| 9,396,829 B2 | 7/2016 | Mann et al. |
| 9,406,985 B2 | 8/2016 | Amaratunga et al. |
| 9,450,266 B2 | 9/2016 | Hosaka et al. |
| 9,502,734 B1 | 11/2016 | Lim et al. |
| 9,615,473 B2 | 4/2017 | Kim |
| 9,692,056 B1 | 6/2017 | Liu et al. |
| 9,711,763 B2 | 7/2017 | Sohn et al. |
| 9,782,082 B2 | 10/2017 | Gannon et al. |
| 9,786,872 B2 | 10/2017 | Suh et al. |
| 9,807,876 B2 | 10/2017 | Catchpole |
| 9,812,681 B2 | 11/2017 | Heo |
| 9,859,586 B2 | 1/2018 | Suh et al. |
| 9,887,644 B2 | 2/2018 | Kim et al. |
| 9,941,492 B2 | 4/2018 | Suh et al. |
| 9,972,868 B2 | 5/2018 | Choi et al. |
| 9,979,225 B2 | 5/2018 | Bernhard |
| 10,033,031 B2 | 7/2018 | Wang et al. |
| 10,090,556 B2 | 10/2018 | Rho et al. |
| 10,122,010 B2 | 11/2018 | Tajima et al. |
| 10,147,915 B2 | 12/2018 | Song et al. |
| 10,199,851 B2 | 2/2019 | Hiroki et al. |
| 10,217,971 B2 | 2/2019 | Takahashi et al. |
| 10,658,651 B2 | 5/2020 | Pierce et al. |
| 10,957,939 B2 | 3/2021 | Zhi et al. |
| 2003/0084847 A1 | 5/2003 | Wood et al. |
| 2003/0099883 A1 | 5/2003 | Ochoa et al. |
| 2004/0086783 A1 | 5/2004 | Fong et al. |
| 2004/0234445 A1 | 11/2004 | Serp et al. |
| 2005/0008778 A1 | 1/2005 | Utsugi et al. |
| 2005/0063891 A1 | 3/2005 | Shaffer et al. |
| 2005/0209392 A1 | 9/2005 | Luo et al. |
| 2005/0221185 A1 | 10/2005 | Sakata et al. |
| 2006/0039849 A1 | 2/2006 | Resasco et al. |
| 2006/0078489 A1 | 4/2006 | Harutyunyan et al. |
| 2006/0116443 A1 | 6/2006 | Probst et al. |
| 2006/0151318 A1 | 7/2006 | Park et al. |
| 2006/0245996 A1 | 11/2006 | Xie et al. |
| 2007/0224106 A1 | 9/2007 | Sakakibara et al. |
| 2007/0274899 A1 | 11/2007 | Wolf et al. |
| 2008/0131351 A1 | 6/2008 | Wang et al. |
| 2008/0210550 A1 | 9/2008 | Walther et al. |
| 2008/0233402 A1 | 9/2008 | Carlson et al. |
| 2008/0258117 A1 | 10/2008 | Sakakibara et al. |
| 2008/0280136 A1* | 11/2008 | Zachariah ............... B82Y 40/00 428/367 |
| 2009/0117026 A1 | 5/2009 | Shimazu et al. |
| 2009/0142659 A1 | 6/2009 | Lai et al. |
| 2009/0208708 A1 | 8/2009 | Wei et al. |
| 2009/0226704 A1 | 9/2009 | Kauppinen et al. |
| 2009/0274609 A1 | 11/2009 | Harutyunyan et al. |
| 2009/0286675 A1 | 11/2009 | Wei et al. |
| 2010/0000441 A1 | 1/2010 | Jang et al. |
| 2010/0038602 A1 | 2/2010 | Plee |
| 2010/0112443 A1 | 5/2010 | Blomgren et al. |
| 2010/0140560 A1 | 6/2010 | Wang et al. |
| 2010/0221606 A1 | 9/2010 | Nalamasu et al. |
| 2010/0276644 A1 | 11/2010 | Wolf et al. |
| 2010/0285352 A1 | 11/2010 | Juzkow et al. |
| 2010/0285358 A1 | 11/2010 | Cui et al. |
| 2011/0020210 A1* | 1/2011 | Liu ........................ B82B 3/00 423/447.1 |
| 2011/0060162 A1 | 3/2011 | Tatsuhara et al. |
| 2011/0111279 A1 | 5/2011 | Smithyman et al. |
| 2011/0123429 A1 | 5/2011 | Bordere et al. |
| 2011/0150746 A1 | 6/2011 | Khodadadi et al. |
| 2011/0158892 A1 | 6/2011 | Yamaki |
| 2011/0171398 A1 | 7/2011 | Oladeji |
| 2011/0173198 A1 | 7/2011 | Malleshaiah et al. |
| 2011/0177393 A1 | 7/2011 | Park et al. |
| 2011/0311874 A1 | 12/2011 | Zhou et al. |
| 2012/0105370 A1 | 5/2012 | Moore |
| 2012/0107683 A1 | 5/2012 | Kim et al. |
| 2012/0132861 A1 | 5/2012 | Tamamitsu et al. |
| 2012/0138148 A1 | 6/2012 | Harutyunyan |
| 2012/0141864 A1 | 6/2012 | Juzkow et al. |
| 2012/0149824 A1 | 6/2012 | Hooke et al. |
| 2012/0177934 A1 | 7/2012 | Vogel et al. |
| 2012/0193602 A1 | 8/2012 | Lieber et al. |
| 2012/0219490 A1 | 8/2012 | Noda et al. |
| 2012/0241666 A1 | 9/2012 | Hong et al. |
| 2012/0282522 A1 | 11/2012 | Axelbaum et al. |
| 2012/0315539 A1 | 12/2012 | Lashmore et al. |
| 2012/0321911 A1 | 12/2012 | Watanabe et al. |
| 2013/0040229 A1 | 2/2013 | Grigorian et al. |
| 2013/0065125 A1 | 3/2013 | Sawaki et al. |
| 2013/0065130 A1 | 3/2013 | Ban et al. |
| 2013/0106026 A1 | 5/2013 | Wang et al. |
| 2013/0143077 A1 | 6/2013 | Yebka et al. |
| 2013/0149440 A1 | 6/2013 | Pyzik et al. |
| 2013/0171485 A1 | 7/2013 | Kodera et al. |
| 2013/0171496 A1 | 7/2013 | Wang et al. |
| 2013/0189565 A1 | 7/2013 | Lashmore et al. |
| 2013/0224651 A1 | 8/2013 | Hiralal et al. |
| 2013/1323583 | 12/2013 | Phares |
| 2014/0013588 A1 | 1/2014 | Wang et al. |
| 2014/0021403 A1 | 1/2014 | Kim et al. |
| 2014/0057178 A1 | 2/2014 | He et al. |
| 2014/0065447 A1 | 3/2014 | Liu et al. |
| 2014/0141248 A1 | 5/2014 | Noyes |
| 2014/0170490 A1 | 8/2014 | Izuhara et al. |
| 2014/0255782 A1 | 9/2014 | Jabbour et al. |
| 2014/0326181 A1 | 11/2014 | Kim |
| 2014/0370347 A1 | 12/2014 | Jung et al. |
| 2015/0010788 A1 | 1/2015 | Aria et al. |
| 2015/0037239 A1 | 2/2015 | Sue et al. |
| 2015/0044581 A1 | 2/2015 | Holme et al. |

(56) References Cited

U.S. PATENT DOCUMENTS

| | | |
|---|---|---|
| 2015/0059571 A1 | 3/2015 | Denton et al. |
| 2015/0064521 A1 | 3/2015 | Watanabe et al. |
| 2015/0087858 A1 | 3/2015 | Ci et al. |
| 2015/0133569 A1 | 5/2015 | Gong et al. |
| 2015/0149193 A1 | 5/2015 | Jester et al. |
| 2015/0188112 A1 | 7/2015 | Adre et al. |
| 2015/0200417 A1 | 7/2015 | Song et al. |
| 2015/0207143 A1 | 7/2015 | Wu et al. |
| 2015/0207168 A1 | 7/2015 | Do et al. |
| 2015/0233010 A1 | 8/2015 | Pan et al. |
| 2015/0236366 A1 | 8/2015 | Chang et al. |
| 2015/0243451 A1 | 8/2015 | Gruner et al. |
| 2015/0243452 A1 | 8/2015 | Gruner et al. |
| 2015/0255828 A1 | 9/2015 | Momo et al. |
| 2015/0279578 A1 | 10/2015 | Martini et al. |
| 2015/0325820 A1 | 11/2015 | Sohn et al. |
| 2015/0333302 A1 | 11/2015 | Johns et al. |
| 2015/0340684 A1 | 11/2015 | Voillequin |
| 2015/0340741 A1 | 11/2015 | Dong et al. |
| 2015/0349325 A1 | 12/2015 | Chen et al. |
| 2015/0364750 A1 | 12/2015 | Maheshwari et al. |
| 2015/0372344 A1 | 12/2015 | Iwasaki et al. |
| 2015/0380738 A1 | 12/2015 | Zhou et al. |
| 2016/0009557 A1 | 1/2016 | Harutyunyan et al. |
| 2016/0013457 A1 | 1/2016 | Suh et al. |
| 2016/0013458 A1 | 1/2016 | Suh et al. |
| 2016/0020437 A1 | 1/2016 | Sohn et al. |
| 2016/0023905 A1 | 1/2016 | Wei |
| 2016/0036059 A1 | 2/2016 | Tokune et al. |
| 2016/0040780 A1 | 2/2016 | Donahue |
| 2016/0049569 A1 | 2/2016 | Negrin |
| 2016/0079629 A1 | 3/2016 | Abe et al. |
| 2016/0082404 A1 | 3/2016 | Pigos |
| 2016/0126554 A1 | 5/2016 | Beneventi et al. |
| 2016/0149253 A1 | 5/2016 | Yi et al. |
| 2016/0166837 A1 | 6/2016 | Strommer et al. |
| 2016/0329533 A1 | 11/2016 | Tajima |
| 2016/0365544 A1 | 12/2016 | Lee et al. |
| 2016/0372717 A1 | 12/2016 | Noda |
| 2017/0005504 A1 | 1/2017 | Rho et al. |
| 2017/0018799 A1 | 1/2017 | Jeong |
| 2017/0033326 A1 | 2/2017 | Goto et al. |
| 2017/0040582 A1 | 2/2017 | Kim |
| 2017/0155098 A1 | 6/2017 | Park et al. |
| 2017/0155099 A1 | 6/2017 | Song et al. |
| 2017/0214052 A1 | 7/2017 | Xu |
| 2017/0263972 A1 | 9/2017 | Rho et al. |
| 2017/0288255 A1 | 10/2017 | Kim et al. |
| 2017/0338439 A1 | 11/2017 | Yokoyama |
| 2017/0338449 A1 | 11/2017 | Rho et al. |
| 2017/0338489 A1 | 11/2017 | Miwa et al. |
| 2018/0026236 A1 | 1/2018 | Lee et al. |
| 2018/0062417 A1 | 3/2018 | Choi et al. |
| 2018/0115026 A1 | 4/2018 | Mairs |
| 2018/0240609 A1 | 8/2018 | Park et al. |
| 2018/0241081 A1 | 8/2018 | Deng et al. |
| 2018/0309117 A1 | 10/2018 | Zhu et al. |
| 2019/0027638 A1 | 1/2019 | Masuda et al. |
| 2019/0033602 A1 | 1/2019 | Lee et al. |
| 2019/0036103 A1 | 1/2019 | Pierce et al. |
| 2019/0088925 A1 | 3/2019 | Harutyunyan et al. |
| 2019/0099129 A1 | 4/2019 | Kopelman et al. |
| 2019/0115633 A1 | 4/2019 | Akihisa |
| 2019/0122464 A1 | 4/2019 | Delong et al. |
| 2019/0140270 A1 | 5/2019 | Wang et al. |
| 2019/0171315 A1 | 6/2019 | Park et al. |
| 2019/0237748 A1 | 8/2019 | Shin et al. |
| 2020/0264663 A1 | 8/2020 | Kumta et al. |
| 2021/0399289 A1 | 12/2021 | Eshraghi et al. |

FOREIGN PATENT DOCUMENTS

| | | |
|---|---|---|
| CN | 102674316 B | 9/2012 |
| CN | 204072059 U | 1/2015 |
| CN | 104752651 A | 7/2015 |
| CN | 103715394 B | 1/2016 |
| CN | 205375473 U | 7/2016 |
| CN | 103280846 B | 8/2016 |
| CN | 106024969 A | 10/2016 |
| CN | 205697720 U | 11/2016 |
| CN | 104392845 B | 3/2017 |
| CN | 104362326 B | 8/2017 |
| CN | 107086306 A | 8/2017 |
| CN | 107611340 A | 1/2018 |
| CN | 108878717 A | 11/2018 |
| CN | 109088071 A | 12/2018 |
| CN | 208690415 U | 4/2019 |
| CN | 106129536 B | 7/2019 |
| DE | 102017123752 B3 | 3/2019 |
| EP | 2 213 369 A1 | 8/2010 |
| EP | 2476648 A1 | 7/2012 |
| EP | 2 835 177 A1 | 2/2015 |
| JP | 6-267515 A | 9/1994 |
| JP | 11-31502 A | 2/1999 |
| JP | 2005-272277 A | 10/2005 |
| JP | 2007-49789 A | 2/2007 |
| JP | 2008-305608 A | 12/2008 |
| JP | 2010-277925 A | 12/2010 |
| JP | 2012-512956 A | 6/2012 |
| JP | 2015-521347 A | 7/2015 |
| JP | 2015-220004 A | 12/2015 |
| JP | 2016-25077 A | 2/2016 |
| JP | 2016-31922 A | 3/2016 |
| JP | 2016-54113 A | 4/2016 |
| JP | 2016-73196 A | 5/2016 |
| JP | 2017-130274 A | 7/2017 |
| JP | 2017-147222 A | 8/2017 |
| JP | 2017-162637 A | 9/2017 |
| KR | 10-2007-0001220 A | 1/2007 |
| KR | 10-1548465 B1 | 8/2015 |
| KR | 10-2016-0047643 A | 5/2016 |
| KR | 10-1632109 B1 | 6/2016 |
| KR | 10-2016-0127648 A | 11/2016 |
| KR | 10-2016-0129440 A | 11/2016 |
| KR | 10-2016-0129500 A | 11/2016 |
| KR | 10-1676641 B1 | 11/2016 |
| KR | 10-1703516 B1 | 2/2017 |
| KR | 10-2017-0036478 A | 4/2017 |
| KR | 10-2017-0037510 A | 4/2017 |
| KR | 10-1729702 B1 | 4/2017 |
| KR | 10-1765459 B1 | 8/2017 |
| KR | 10-1795544 B1 | 11/2017 |
| KR | 10-2019-0040554 A | 4/2019 |
| WO | WO 2005/052053 A1 | 6/2005 |
| WO | WO 2005/096089 A1 | 10/2005 |
| WO | WO 2011/030821 A1 | 3/2011 |
| WO | WO 2012/156297 A2 | 11/2012 |
| WO | WO 2014/102131 A2 | 7/2014 |
| WO | WO 2014/153465 A1 | 9/2014 |
| WO | WO 2015/100762 A1 | 7/2015 |
| WO | WO 2016/031335 A1 | 3/2016 |
| WO | WWO 2016/178210 A1 | 11/2016 |
| WO | WO 2017/052248 A1 | 3/2017 |
| WO | WO 2017/120391 A1 | 7/2017 |
| WO | WO 2017/131451 A1 | 8/2017 |
| WO | WO 2018/110933 A1 | 6/2018 |
| WO | WO 2018/194414 A1 | 10/2018 |
| WO | WO-2018/194415 A1 | 10/2018 |
| WO | WO 2019/027847 A1 | 2/2019 |

OTHER PUBLICATIONS

Li, et al., Large area, highly transparent carbon nanotube spiderwebs for energy harvesting, J. Mater. Chem. 2010; 20: 7236-7240 (Year: 2010).*

Su, et al., High-Performance Two-Ply Yarn Supercapacitors Based on Carbon Nanotube Yarns Dotted with $Co_3O_4$ and NiO Nanoparticles, Small 2015; 11(7): 854-861 with Supporting Information (Year: 2015).*

Liu et al.; "Carbon nanotube (CNT)-based composites as electrode material for rechargeable Li-ion batteries: A review"; Composite Science and Technology, vol. 72, Issue 2 (Jan. 18, 2012); pp. 121-144. (Year:2012).

(56) References Cited

OTHER PUBLICATIONS

Joo-Seong Kim et al., Supporting Information, A Half Millimeter Thick Coplanar Flexible Battery with Wireless Recharging Capability, Nano Letters 2015 15 (4), 9 Pages, 2015.
Xiong Pu et al., "A Self-Charging Power Unit by Integration of a Textile Triboelectric Nanogenerator and a Flexible Lithium-Ion Battery for Wearable Elecronics", Advanced Materials 27, pp. 2472-2478, (2015).
Extended European Search Report dated Aug. 26, 2018.
Extended Search Report of related EP Application No. 18 19 4454 dated Jul. 23, 2019.
Jenax Inc., Flexible Lithium Polymer Battery J . Flex, Copyright 2014, 6 Pages.
Nanalyze., A Flexible Battery from Blue Spark Technologies, Apr. 8, 2014, 4 Pages.
Panasonic Corp., Panasonic Develops Bendable, Twistable, Flexible Lithium-ion Battery, Sep. 29, 2016, 8 Pages.
ProLogium Technology Co., Ltd., FLCB Flexible Type LCB, Copyright 2015, 6 Pages.
Sebastian Anthony., LG produces the first flexible cable-type lithium-ion battery, ExtremeTech, Aug. 30, 2012, 9 Pages.
The Swatch Group Ltd., A revolutionary battery by Belenos: The Watchmaker Swatch Group Has SignedAn Agreement With The Chinese Geely Group For Use Of Its Innovative New Battery., as accessed on May 29, 2019, 3 Pages, https://www.swatchgroup.com/en/swatch-group/innovation-powerhouse/industry-40/revolutionary-battery-belenos.
Vishwam Sankaran., Samsung is reportedly developing a curved battery for its foldable phone, Jul. 4, 2018, 4 Pages.
International Search Report issued by the International Searching Authority in corresponding International Patent Application No. PCT/US2020/020993, dated Jul. 2, 2020.
Written Opinion issued by the International Searching Authority in corresponding International Patent Application No. PCT/US2020/020993, dated Jul. 2, 2020.
Communication issued by the International Searching Authority in corresponding International Application No. PCT/US19/49923 dated Nov. 13, 2019.
Kun Kelvin Fu et al., "Flexible Batteries: From Mechanics to Devices", 2016 American Chemical Society, ACS Publications, ACS Energy Letters 1, pp. 1065-1079, (2016).
Sau Yen Chew et al., "Flexible free-standing carbon nanbtube films for model lithium-ion batteries", Carbon 47, pp. 2976-2983, (2009).
Sheng Xu et al., "Stretchable batteries with self-similar serpentine interconnects and integrated wireless recharging systems," Nature communications 4:1543, DOI: 10.1038/ncomms2553, 8 Pages Total, (2013).
Shu Luo et al., "Binder-Free LiCoO2/ Carbon Nanotube Cathodes for High-Performance Lithium Ion Batteries", Advanced Materials 24, pp. 2294-2298, (2012).
Zhiqian Wang et al., "Fabrication of High-Performance Flexible Alkaline Batteries by Implementing Multiwailed Carbon Nanotubes and Copolymer Separator" Advanced Materials 26, pp. 970-976, (2014).
Zhiqiang Niu et al., "A "skeleton/skin" strategy for preparing ultrathin free-standing single-walled carbon nanotube/polyaniline films for high performance supercapacitor electrodes", The Royal Society of Chemistry 2012, Energy & Environmental Science 5, pp. 8726-8733, (2012).
Office Action issued by the European Patent Office in corresponding European Patent Application No. 18184002.6, dated May 13, 2020.
A. Weidenkaff et al. "Metal Nanoparticles for the Production of Carbon Nanotube Composite Materials by Decomposition of Different Carbon Sources" Materials Science and Engineering C, vol. 19, pp. 119-123, 2002.
A.J. Clancy et al., "A One-Step Route to Solubilised, Purified or Functionalised Single-Walled Carbon Nanotunes", Journal of Materials Chemistry A, p. 16708-16715, 2015.

Beate Krause et al., "Disperability and Particle Size Distribution of CNTs in an Aqeous Surfactant Dispersion as a Function of Ultrasonic Treatment Time" Carbon 48, pp. 2746-2754, 2010.
Chee Howe See et al., "CaCO3 Suppoerted Co—Fe Catalysts for Carbon Nanotube Synthesis in Fluidized Bed Reactors" Particle Technology and Fluidization, vol. 54, No. 3, pp. 657-664, Mar. 2008.
Communication dated Aug. 26, 2019, from the European Patent Office in related European Application No. 18186402.6.
Communication dated Jul. 31, 2019, from the European Patent Office in related European Application No. 18194454.7.
Danafar et al., "Fluidized bed catalytic chemical vapor deposition synthesis of carbon nanotubes—A review," The Chemical Engineering Journal, vol. 155, pp. 37-48, 2009.
Dunens, O., et al., "Synthesis of Multiwalled Carbon Nanotubes on Fly Ash Derived Catalysts," Environ. Sci. Technol., vol. 43, pp. 7889-7894, 2009.
Extended European Search Report issued in corresponding European Patent Application No. 18186402.6 dated Oct. 11, 2018.
Extended European Search Report issued in corresponding European Patent Application No. 18194469.5 dated Dec. 4, 2018.
Extended European Search Report of related European Patent Application No. 18184002.6, dated Nov. 30, 2018.
Hasegawa Kei et al., "Lithium Ion Batteries Made of Electrodes with 99 wt% active materials and 1wt% carbon nanotubes without binder or metal foils", Journal of Power Sources, vol. 321, pp. 155-162, 2016.
Howard Wang, "Dispersing Carbon Nanotubes Usuing Surfactants" Current Opinion in Colloid & Interface Science 14, pp. 364-371, 2009.
Hu, Liangbing et al., Thin, Flexible Secondary Li-Ion Paper Batteries, ACS Nano, vol. 4, No. 10, pp. 5843-5848, 2010.
International Search Report and Written Opinion, issued by International Searching Authority in related International Application No. PCT/US2020/039821, dated Sep. 30, 2020.
Linqin Jiang et al., "Production of Aqueous Colloidal Dispersions of Carbon Nanotubes", Journal of Colloid and Interface Science, pp. 89-94, 2003.
Luo Shu et al., "Binder-Free LiCoO2/Carbon Nanotube Cathodes for High-Performance Lithium Ion Batteries" Advanced Materials, vol. 24, pp. 2294-2298, 2012.
O.M. Marago, et al., "Optical trapping of carbon nanotubes", Physica E, 40 (2008), pp. 2347-2351.
Sarah Maghsoodi et al., "A Novel Continuous Process for Synthesis of Carbon Nanotubes Using Iron Floating Catalyst and MgO Particles for CVD of methane in a fluidized bed reactor" Applied Surface Science, vol. 256, pp. 2269-2274, 2010.
Wang Ke et al., "Super-Aligned Carbon Nanotube Films as Current Collectors for Lightweight and Flexible Lithium Ion Batteries" Advanced Functional Materials, vol. 23, pp. 846-853, 2013.
Zhao, M.Q. et al., "Towards high purity graphene/single-walled carbon nanotube hybrids with improved electrochemical capacitive performance," Carbon, vol. 54, pp. 403-411, 2013.
Extended European Search Report issued in corresponding European Patent Application No. 18173644.8 dated Oct. 12, 2018.
International Search Report and the Written Opinion issued by the International Searching Authority corresponding to PCT/US20/43017, dated Dec. 14, 2020.
Notice of Reasons for Rejection issued by the Japanese Patent Office corresponding to Japanese Application No. 2017-048275, dated Dec. 1, 2020.
Notice of Reasons for Rejection issued by the Japanese Patent Office corresponding to Japanese Patent Application No. 2017-048276, dated Dec. 1, 2020.
Notice of Reasons for Rejection issued by the Japanese Patent Office corresponding to Japanese Patent Applivation No. 2020-002026, dated Dec. 22, 2020.
Schiller, David. "Development of a Stretchable Battery Pack for Wearable Applications." submittedby David Schiller, BSc. Diss. Universit't Linz, Nov. 2019, p. 19-37 [online] <https://epub.jku.at/obvulihs/content/titleinfo/4605900/full.pdf>.

(56) References Cited

OTHER PUBLICATIONS

International Search Report and Written Opinion issued by the International Search Authority in corresponding International Application No. PCT/US19/49923, dated Jan. 23, 2020.
Communication dated Sep. 26, 2021, issued by the Korean Intellectual Property Office in related Korean Application No. 10-2018-0058433.
Office Action issued by Chinese Patent Office in related Chinese Patent Application No. 201710151455.7, dated Jul. 16, 2021.
Notice of Reasons for rejection issued by the Japanese Patent Office related to Japanese Patent Application No. 2020-002545, dated Aug. 17, 2021.
Jung, Sungmook, et al., "Wearable Fall Detector using Integrated Sansors and Energy Devices", Scientific Reports, pp. 1-9, Nov. 24, 2015.
Office Action issued by the Korean Patent Office in related Korean Patent Application No. 10-2020-0005929; dated Jul. 27, 2021.
Ostfeld, Aminy E., et al., "High-performance flexible energy storage and harvesting systen for wearable electronics", Scientific Reports, pp. 1-10, May 17, 2016.
Communication dated Mar. 14, 2022, issued by the Japanese Patent Office in related Japanese Application No. 2618-142355.
Shi, Yang, et al., "Graphene-based integrated electrodes for flexible lithium ion batteries", 2D Materials 2.2 (2015) 0204004 (2015).

* cited by examiner

COMPOSITE YARN AND METHOD OF MAKING A CARBON NANOTUBE COMPOSITE YARN

CROSS REFERENCE TO RELATED APPLICATIONS

This application claims priority to U.S. Provisional Patent Application No. 62/813,516, filed Mar. 4, 2019, the entirety of which is incorporated herein by reference.

TECHNICAL FIELD

The present disclosure is directed to a composite yarn and a method of preparing carbon nanotube composite yarns.

BACKGROUND

Carbon nanotube-based yarns are promising candidates for use in various applications due to their unique properties, such as their ultra-high strength, high electrical conductivities, high thermal conductivities, and electric field emissions, among others.

SUMMARY

However, it may be possible to dramatically expand the range of these yarns' unique applications by depositing or decorating the surface of the yarns or incorporating/embedding with secondary materials, such as metals and their oxides, ceramics, and/or thin films and various molecular species, depending on the required application. As such, there is a need in the art for an effective and efficient method of preparing carbon nanotube composite yarns.

The present disclosure is directed to a method of making carbon nanotube composite yarns, the method comprising the steps of growing floating carbon nanotubes in a reactor, removing webs of the carbon nanotubes from the reactor and, optionally in parallel, depositing secondary particles on at least a portion of the webs of carbon nanotubes to provide a carbon nanotube composite mat, and densifying the carbon nanotube composite mat to provide a carbon nanotube composite yarn. The disclosure is also directed to carbon nanotube composite yarns provided by the method described herein and devices comprising the carbon nanotube composite yarns provided by the method described herein, as well as methods of using the same. Optionally, the webs of carbon nanotubes are continuously removed from the reactor.

DETAILED DESCRIPTION

The present disclosure is directed to a method of making carbon nanotube composite yarns, the method comprising the steps of growing floating carbon nanotubes in a reactor, removing webs of the carbon nanotubes from the reactor and, optionally in parallel, depositing secondary particles on at least a portion of the webs of carbon nanotubes to provide a carbon nanotube composite mat, and densifying the carbon nanotube composite mat to provide a carbon nanotube composite yarn. The disclosure is also directed to carbon nanotube composite yarns provided by the method described herein and devices comprising the carbon nanotube composite yarns provided by the method described herein, as well as methods of using the same.

The method may comprise growing floating carbon nanotubes in a reactor. As used herein, the term "nanotube" refers to a tube having at least one dimension on the nanoscale, that is, at least on dimension between about 0.6 and 100 nm. For example, a nanotube may comprise a tube having a diameter on the nanoscale. According to some aspects, the nanotubes according to the present disclosure may be selected from the group consisting of single-walled carbon nanotubes (SWNTs), double-walled carbon nanotubes (DWNTs), and multi-walled carbon nanotubes (MWNTs), and combinations thereof.

Figure 1A:
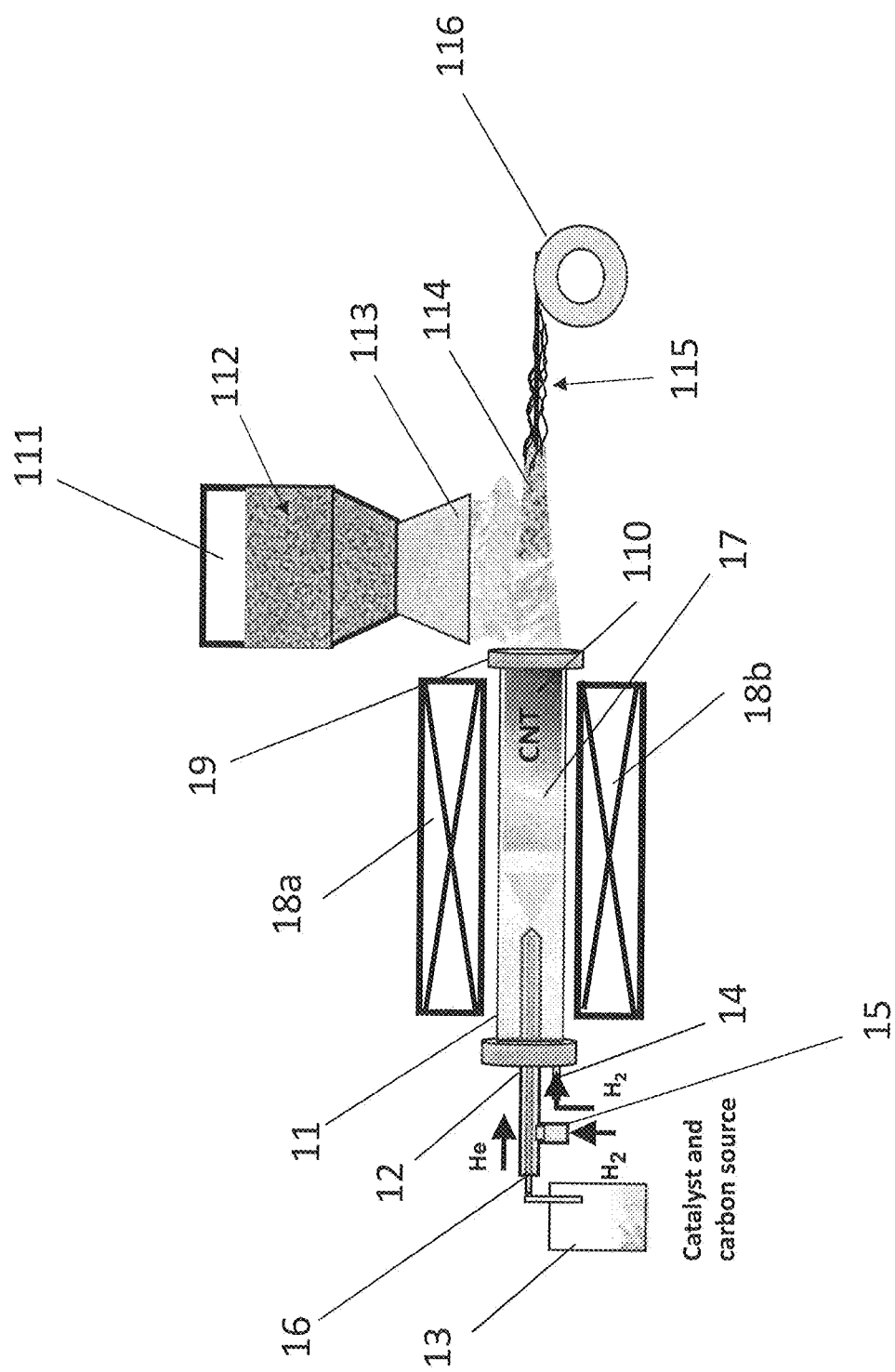
FIG. 1A shows an example schematic for preparing a carbon nanotube composite yarn according to aspects of the present disclosure.

The floating carbon nanotubes may be grown in a reactor, such as a chemical vapor deposition (CVD) reactor. For example, FIG. 1A shows an example reactor 11 that may be used according to aspects of the present disclosure. As shown in FIG. 1A, the reactor 11 may comprise at least a first inlet 12 in fluid communication with a carbon source chamber 13, the carbon source chamber 13 configured to provide a carbon source, such as a carbon source gas.

Examples of carbon sources include, but are not limited to, one or more carbon-containing gases, one or more hydrocarbon solvents, and mixtures thereof. Specific examples include, but are not limited to, gases and/or solvents containing and/or consisting of a hydrocarbon, an alcohol, an ester, a ketone, an aromatic, an aldehyde, and a combination thereof. For example, the carbon source may be selected from xylene, toluene, propane, butane, butene, ethylene, ethanol, carbon monoxide, butadiene, pentane, pentene, methane, ethane, acetylene, carbon dioxide, naphthalene, hexane, cyclohexane, benzene, methanol, propanol, propylene, commercial fuel gases (such as liquefied petroleum gas, natural gas, and the like), and combinations thereof.

The carbon source chamber 13 may also be configured to provide a catalyst and/or a catalyst precursor, such as a catalyst and/or a catalyst precursor vapor.

As used herein, the term "catalyst" refers to a component that provokes or speeds up a chemical reaction, for example, the synthesis of nanotubes. Examples of catalysts useful according to the present disclosure include, but are not limited to, transition metals, lanthanide metals, actinide metals, and combinations thereof. For example, the catalyst may comprise a transition metal such as chromium (Cr), molybdenum (Mo), tungsten (W), iron (Fe), cobalt (Co), nickel (Ni), ruthenium (Ru), rhodium (Rh), palladium (Pd), osmium (Os), iridium (Ir), copper (Cu), silver (Ag), gold (Au), cadmium (Cd), scandium (Sc), yttrium (Y), lanthanum (La), platinum (Pt), and/or combinations thereof. The catalyst may be a supported catalyst or an unsupported catalyst. According to some aspects, a combination of two or more metals may be used, for example, an iron, nickel, and cobalt mixture. In one example, the mixture may comprise a 50:50 mixture (by weight) of nickel and cobalt. The catalyst may comprise a pure metal, a metal oxide, a metal carbide, a nitrate salt of a metal, other compounds containing one or more of the metals described herein, and/or a combination thereof.

As used herein, the term "catalyst precursor" refers to a component that can be converted into an active catalyst. Examples of catalyst precursors include, but are not limited to, transition metal salts, such as a nitrate, acetate, citrate, chloride, fluoride, bromide, iodide, and/or hydrates thereof, and combinations thereof. For example, the catalyst precursor may be a metallocene, a metal acetylacetonate, a metal phthalocyanine, a metal porphyrin, a metal salt, a metalorganic compound, a metal sulfate, a metal hydroxide, a metal carbonate, or a combination thereof. For example, the catalyst precursor may be a ferrocene, nickelocene, cobaltocene, molybdenocene, ruthenocene, iron acetylacetonate, nickel acetylacetonate, cobalt acetylacetonate, molybdenum acetylacetonate, ruthenium acetylacetonate, iron phthalocyanine, nickel phthalocyanine, cobalt phthalocyanine, iron porphyrin, nickel porphyrin, cobalt porphyrin, an iron salt, a nickel salt, cobalt salt, molybdenum salt, ruthenium salt, or a combination thereof. The catalyst precursor may comprise a soluble salt such as $Fe(NO_3)_3$, $Ni(NO_3)_2$ or $Co(NO_3)_2$ dissolved in a liquid such as water. The catalyst precursor may achieve an intermediate catalyst state in the catalyst particle growth zone of the reactor, and subsequently become converted to an active catalyst upon exposure to the nanostructure growth conditions in the nanostructure growth zone of the reactor. For example, the catalyst precursor may be a transition metal salt that is converted into a transition metal oxide in the catalyst particle growth zone, then converted into active catalytic nanoparticles in the nanostructure growth zone.

It should be understood that while FIG. 1A shows a carbon source chamber 13 containing both a carbon source and a catalyst and/or catalyst precursor, the carbon source chamber 13 in fluid communication with the reactor 11 via the first inlet 12, the carbon source and the catalyst and/or catalyst precursor may be provided in separate chambers optionally in fluid communication with the reactor 11 via separate inlets.

The carbon source and catalyst and/or catalyst precursor may be provided to the reactor via a carrier gas, such as an inert carrier gas. For example, FIG. 1A shows the carbon source and catalyst and/or catalyst precursor provided to the reactor 11 via a helium (He) gas. Examples of inert gases useful according to the present disclosure include, but are not limited to, gases comprising helium (He), radon (Rd), neon (Ne), argon (Ar), xenon (Xe), nitrogen (N), and combinations thereof.

As shown in FIG. 1A, the reactor 11 may be provided with a second inlet 14. The second inlet 14 may be in fluid communication with, for example, a hydrogen gas source, which may be provided in order to provide a higher growth yield and/or to control SWNT vs. MWNT production. Hydrogen gas may additionally or alternatively be provided via a third inlet 15 that is in fluid communication with a carbon source chamber passage 16, the carbon source chamber passage 16 configured to provide fluid communication between the carbon source chamber 13 and the first inlet 12.

The method may comprise growing floating carbon nanotubes in the reactor. For example, floating carbon nanotubes 17 may be grown in reactor 11, as shown in FIG. 1A. As used herein, the term "floating" refers to a state of being suspended, for example, suspended in a gas or liquid. As shown in FIG. 1A, the floating carbon nanotubes 17 may be suspended in the inert gas as described herein. The temperature of the reactor 11 may be maintained and/or varied using one or more heat sources 18a and 18b. In an illustrative example, heat sources 18a and 18b may individually or together comprise a furnace or a lamp. The one or more heat sources 18a and 18b may be proximal to reactor 11 and may maintain the temperature of reactor 11 at a temperature suitable for reducing the catalyst precursor into active catalyst and/or for the synthesis and/or formation of carbon nanotubes. According to some aspects, the one or more heat sources 18a and 18b may maintain the temperature of reactor 11 at a temperature of between about 300 and 1800° C., optionally between about 450 and 1600° C.

Figure 2:
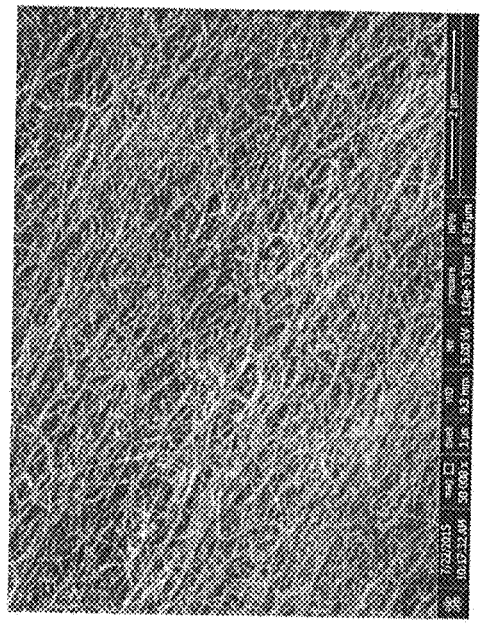
FIG. 2 shows a Scanning Electron Microscope (SEM) image of a pure carbon nanotube mat according to aspects of the present disclosure.
Figure 3:
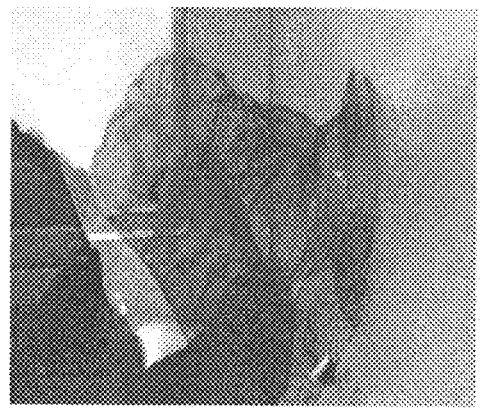
FIG. 3 shows a photograph of a pure carbon nanotube mat according to aspects of the present disclosure.

The method may comprise providing a structure including, but not limited to, a mat of the carbon nanotubes, alternatively referred to herein as a "web." As used herein, the term "mat" or "web" refers to a tangled or bundled mass, such as a tangled, non-densified mass formed downstream of the nanotube growth zone by the floating carbon nanotubes. The mat of carbon nanotubes may be provided, for example, in and/or on the reactor and/or by continuously pulling the floating carbon nanotubes from the reactor. For example, FIG. 1A shows an example of floating carbon nanotubes 17 prepared in a nanotube growth zone of reactor 11. A mat of carbon nanotubes 110 may then form in reactor 11 downstream of the nanotube growth zone. It should be understood that the mat of carbon nanotubes 110 may deposit on the inner walls of reactor 11 and/or along the edges of outlet 19 of reactor 11. The mat of carbon nanotubes 110 may be pulled from reactor 11 through outlet 19 via a high flow rate of the carrier gas and/or hydrogen gas, as described herein. FIG. 2 shows an SEM image of a pure carbon nanotube mat, for example, a mat of carbon nanotubes 110 as shown in FIG. 1A. FIG. 3 shows a photograph of a pure carbon nanotube mat, for example, a mat of carbon nanotubes 110 as shown in FIG. 1A.

The method may comprise depositing a secondary material on at least a portion of the carbon nanotubes to provide a carbon nanotube composite yarn. According to some aspects, the method may comprise depositing a secondary material on at least a portion of the mat of carbon nanotubes to provide a carbon nanotube composite mat followed by a densification step wherein the carbon nanotube composite mat is densified to provide a carbon nanotube composite yarn. Alternatively or additionally, the method may comprise a simultaneous deposition and densification step, wherein the secondary material is deposited on at least a portion of the mat of carbon nanotubes while the mat of carbon nanotubes is simultaneously densified to provide a carbon nanotube composite yarn. According to some aspects, the deposition and/or densification steps may be continuous steps performed in parallel with continuously pulling the mat of carbon nanotubes from the reactor, as described herein.

As used herein, the term "secondary material" refers to a material comprising at least one material that is different from the carbon nanotube mat. Examples of materials useful as secondary materials according to the present disclosure include, but are not limited to, metals, metal oxides, lithium metal oxides, lithium iron phosphate, ceramics, carbon-based materials, and combinations thereof. Examples of carbon-based materials include, but are not limited to, graphite particles, graphite and graphene flakes, hard carbon, and combinations thereof.

In an illustrative example, the carbon-based material is an electrode active material for use in an electrode, and in particular, in the anode of a battery. Examples of metal oxides include, but are not limited to, any metal oxide that may be used as an electrode active material in an electrode. In an illustrative example, the metal oxide is a material for use in the cathode of a battery. Non-limiting examples of metal oxides include those that comprise Ni, Mn, Co, Al, Mg, Ti, or any mixtures thereof. The metal oxide may be lithiated. In an illustrative example, the metal oxide is lithium nickel manganese cobalt oxide ($LiNiMnCoO_2$). In another illustrative example, the metal oxide is Li-Me-O. Metals in lithium metal oxides according to the present disclosure may include, but are not limited to, one or more alkali metals, alkaline earth metals, transition metals, aluminum, or post-transition metals, and hydrates thereof.

"Alkali metals" are metals in Group I of the periodic table of the elements, such as lithium, sodium, potassium, rubidium, cesium, or francium.

"Alkaline earth metals" are metals in Group II of the periodic table of the elements, such as beryllium, magnesium, calcium, strontium, barium, or radium.

"Transition metals" are metals in the d-block of the periodic table of the elements, including the lanthanide and actinide series. Transition metals include, but are not limited to, scandium, titanium, vanadium, chromium, manganese, iron, cobalt, nickel, copper, zinc, yttrium, zirconium, niobium, molybdenum, technetium, ruthenium, rhodium, palladium, silver, cadmium, lanthanum, cerium, praseodymium, neodymium, promethium, samarium, europium, gadolinium, terbium, dysprosium, holmium, erbium, thulium, ytterbium, lutetium, hafnium, tantalum, tungsten, rhenium, osmium, iridium, platinum, gold, mercury, actinium, thorium, protactinium, uranium, neptunium, plutonium, americium, curium, berkelium, californium, einsteinium, fermium, mendelevium, nobelium, and lawrencium.

"Post-transition metals" include, but are not limited to, gallium, indium, tin, thallium, lead, bismuth, or polonium.

The term "electrode" refers to an electrical conductor where ions and electrons are exchanged with an electrolyte and an outer circuit. "Positive electrode" and "cathode" are used synonymously in the present description and refer to the electrode having the higher electrode potential in an electrochemical cell (i.e. higher than the negative electrode). "Negative electrode" and "anode" are used synonymously in the present description and refer to the electrode having the lower electrode potential in an electrochemical cell (i.e. lower than the positive electrode). Cathodic reduction refers to a gain of electron(s) of a chemical species, and anodic oxidation refers to the loss of electron(s) of a chemical species.

According to some aspects, the secondary material may be provided as secondary particles that are deposited on at least a portion of the mat of carbon nanotubes. According to some aspects, the particles may have a particle size from about 1 nanometer to about 100 microns, optionally from about 1 nanometer to about 10 nanometers. FIG. 1A shows a secondary particle chamber 111 containing secondary particles 112 as described herein. The secondary particle chamber 111 may comprise at least one outlet 113 proximal to outlet 19 of reactor 11. In this way, the mat of carbon nanotubes 110 leaving reactor 11 via outlet 19 may be subjected to secondary particles 112. It should be understood that while FIG. 1A shows only one secondary particle chamber 111, two, three, or more secondary particle chambers may be provided, wherein each of the plurality of secondary particle chambers comprises the same type or a different type of secondary particles from at least one other of the plurality of secondary particle chambers.

It is to be understood that the secondary particle chamber 111 and delivery mechanism is not limited. In a non-limiting example, the secondary particle chamber 111 may include one or more of belt feeders, gravimetric feeders, pneumatic feeders, vacuum feeders, screw feeders, vibratory feeders, volumetric feeders, and valves.

According to some aspects, the secondary particles may be provided via one or more carriers. Examples of carriers include any substance known in the art configured to supply secondary particles to a substrate (for example, a mat of carbon nanotubes) as described herein without damaging the carbon nanotubes and/or the secondary particles. Examples of suitable carriers include gas carriers, liquid carriers, and combinations thereof. Example gas carriers include, but are not limited to, Ar, He, $N_2$, dry air, and combinations thereof. Example liquid carriers include, but are not limited to, water, acetone, ethanol, and combinations thereof. According to some aspects, the one or more carriers may be provided with the secondary particles 112 in the secondary particle chamber 111, as shown in FIG. 1A. Alternatively or additionally, one or more additional carrier chambers (not shown) may be provided such that the carrier and secondary particles are in communication prior to being deposited on the mat of carbon nanotubes. It should also be understood that a carrier may be excluded from the process as described herein such that the secondary particles are deposited on at least a portion of the mat of carbon nanotubes, for example, as a powder.

Figure 4:
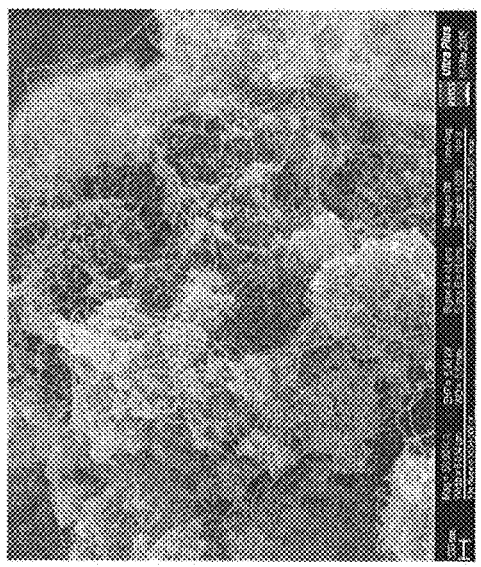
FIG. 4 shows an SEM of a carbon nanotube composite mat according to aspects of the present disclosure.

FIG. 1A shows a carbon nanotube composite mat 114 comprising at least a portion of secondary particles 112. FIG. 4 shows an SEM image of a carbon nanotube composite mat, for example, a carbon nanotube composite mat 114 as shown in FIG. 1A, comprising carbon nanotubes and a metal oxide powder. According to some aspects, the carbon nanotube composite mat may comprise 90% (w/w) or less carbon nanotube, optionally 80% (w/w) w/w or less, optionally 70% (w/w) w/w or less, optionally 60% (w/w) w/w or less, optionally 50% (w/w) w/w or less, optionally 40% (w/w) w/w or less, optionally 30% (w/w) w/w or less, optionally 20% (w/w) w/w or less, optionally 10% (w/w) w/w or less, optionally 9% (w/w) w/w or less, optionally 8% (w/w) w/w or less, optionally 7% (w/w) w/w or less, optionally 6% (w/w) w/w or less, optionally 5% (w/w) w/w or less, optionally 4% (w/w) w/w or less, optionally 3% (w/w) w/w or less, optionally 2% (w/w) w/w or less, and optionally 1% (w/w) w/w or less. According to some aspects, the carbon nanotube composite mat may comprise 10% (w/w) or more secondary particles, optionally 20% (w/w) or more secondary particles, optionally 30% (w/w) or more secondary particles, optionally 40% (w/w) or more secondary particles, optionally 50% (w/w) or more secondary particles, optionally 60% (w/w) or more secondary particles, optionally 70% (w/w) or more secondary particles, optionally 80% (w/w) or more secondary particles, optionally 90% (w/w) or more secondary particles, optionally 91% (w/w) or more, optionally 92% (w/w) or more, optionally 93% (w/w) or more, optionally 94% (w/w) or more, optionally 95% (w/w) or more, optionally 96% (w/w) or more, optionally 97% (w/w) or more, optionally 98% (w/w) or more, and optionally 99% (w/w) or more. According to some aspects, the carbon nanotube composite mat may comprise from 0.1% to 4% (w/w) carbon nanotubes, and the balance secondary particles and optionally one or more additives. Optionally, the carbon nanotube composite mat may comprise from 0.2% to 3% (w/w) carbon nanotubes, and the balance secondary particles and optionally one or more additives. Optionally the carbon nanotube composite mat may comprise from 0.75% to 2% (w/w) carbon nanotubes, and the balance secondary particles and optionally one or more additives. Additives and/or dopants may be present for each range in an amount of from 0 to 5% (w/w). In a non-limiting example, the carbon nanotube composite mat consists essentially of the carbon nanotubes and the secondary particles. In a non-limiting example, the carbon nanotube composite mat consists of the carbon nanotubes and the secondary particles.

The method may comprise densifying the carbon nanotube composite mat to provide a carbon nanotube composite yarn as described herein. For example, the carbon nanotube composite mat may be subjected to a liquid bath and/or a rolling press and/or a spindle and/or a cylindrical pipe and/or a tube, such as by spinning, pulling, and/or passing the carbon nanotube composite mat through or around the liquid bath and/or the rolling press and/or the spindle and/or the cylindrical pipe and/or the tube. In this way, the carbon nanotube composite mat 114 may be compacted to provide a carbon nanotube composite yarn 115, for example, as shown in FIG. 1A.

As shown in FIG. 1A, the carbon nanotube composite yarn 115 may be further processed, for example, by spinning the carbon nanotube composite yarn 115 around a spool 116. Alternatively or additionally, the further processing step(s) may comprise removing excess secondary material from the carbon nanotube composite mat and/or the carbon nanotube composite yarn, for example, via shaking. It should be understood that one or more of the further processing step(s) may occur prior to and/or after the densification step(s) as described herein.

Figure 1B:
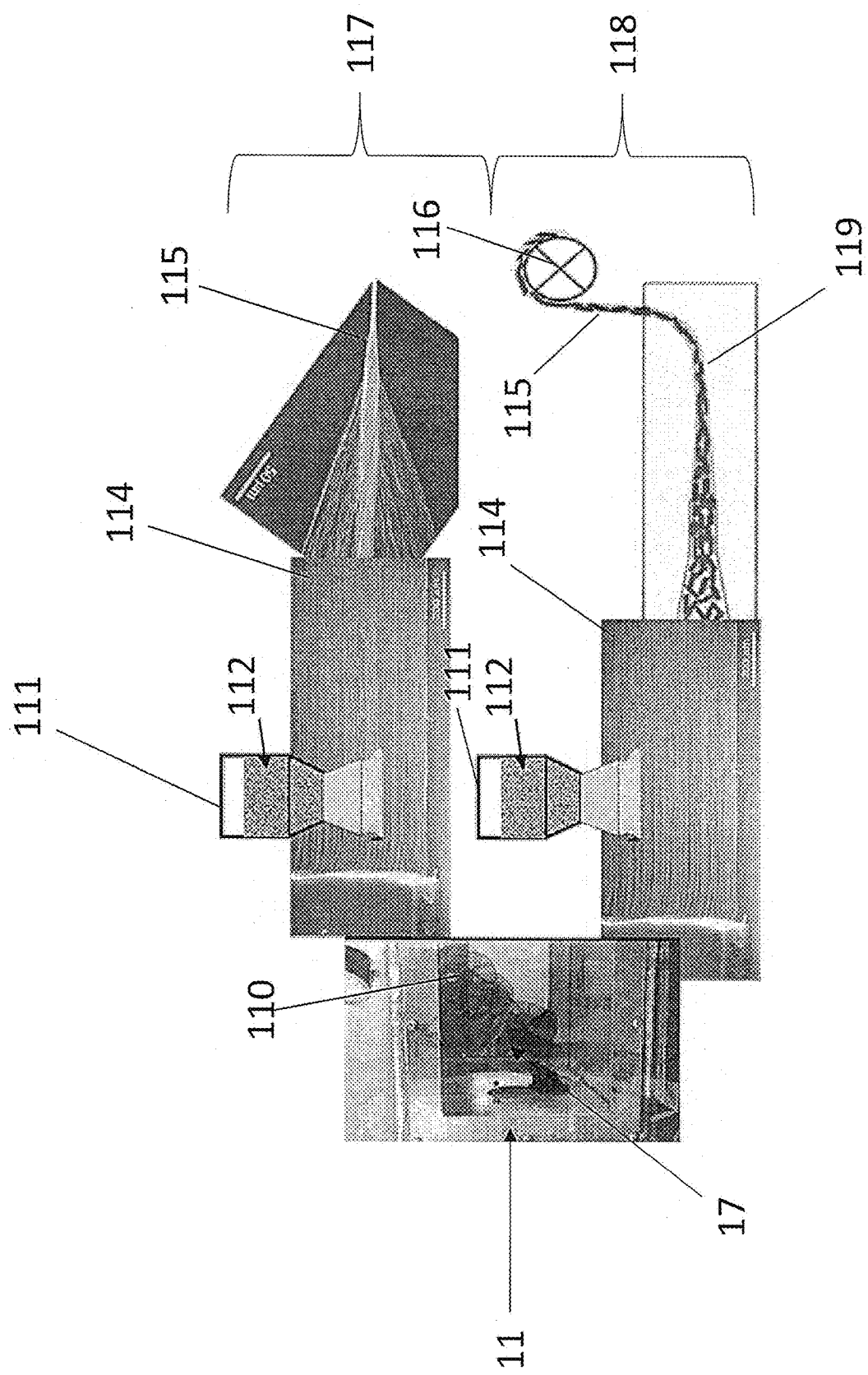
FIG. 1B shows a schematic of two example densification steps according to aspects of the present disclosure.

FIG. 1B shows two example densification steps as described herein. In particular, FIG. 1B shows floating carbon nanotubes 17 grown in a reactor 11 to provide a mat of carbon nanotubes 110, for example, as described in relation to FIG. 1A. FIG. 1B further shows a secondary particle chamber 111 containing secondary particles 112 as described in relation to FIG. 1A. FIG. 1B further shows two example densification steps, including a spinning densification step 117 and a liquid bath densification step 118. In particular, spinning densification step 117 may comprise spinning a carbon nanotube composite mat 114 (carbon nanotube composite mat 114 comprising at least a portion of secondary particles 112 as described herein) through or around a rolling press and/or a spindle in order to form a carbon nanotube composite yarn 115 as described herein, similar to the example shown in FIG. 1A.

FIG. 1B also shows a liquid bath densification step 118, which may be performed instead of or in addition to spinning densification step 117. As shown in FIG. 1B, liquid bath densification step 118 may comprise subjecting a carbon nanotube composite mat 114 as described herein to a liquid bath 119 comprising a solvent. According to some aspects, the solvent may be any solvent known in the art configured to densify a mat of carbon nanotubes as described herein. Example solvents include, but are not limited to, water, acetone, ethanol, and combinations thereof. It should be understood that subjecting the carbon nanotube composite mat 114 to the liquid bath 119 comprising the solvent may provide a carbon nanotube composite yarn 115, as shown in FIG. 1B, which may be further processed as described herein, for example, by spinning the carbon nanotube composite yarn 115 around a spool 116. It should be understood that the further processing step(s) may be selected such that at least a portion of the solvent adhered to the carbon nanotube composite yarn 115 after it has been subjected to liquid bath 119 evaporates from the carbon nanotube composite yarn 115.

It should be understood that the method may comprise a simultaneous deposition and densification step as described herein, wherein the secondary material is deposited on at least a portion of the mat of carbon nanotubes while the mat of carbon nanotubes is simultaneously or about simultaneously densified to provide a carbon nanotube composite yarn. For example, the carrier as described herein may be configured to simultaneously deposit the secondary particles on the mat of carbon nanotubes and densify the mat of carbon nanotubes. One non-limiting example of such a step comprises the use of a solvent as described herein, wherein the solvent is used as a carrier to deposit the secondary particles on the mat of carbon nanotubes, as described herein. The solvent may simultaneously densify the mat of carbon nanotubes as described herein (e.g., as described in relation to liquid bath densification step 118 shown in FIG. 1B) to provide a carbon nanotube composite yarn. It should be understood that the simultaneous deposition and densification step may be performed instead of or in addition to one or more other steps as described herein, including one or more additional deposition steps, one or more additional densification steps, one or more additional simultaneous deposition and densification steps, one or more additional processing steps, and combinations thereof, wherein each additional step is individually performed before or after the simultaneous deposition and densification step.

In an illustrative example, the entire process for making the carbon nanotube composite yarn may be a continuous process. For example, the carbon source may be fed continuously to the reactor 11 so that the carbon nanotube mat may be continuously fed to the secondary particle chamber 111 for continuous deposition of the secondary particles, and the resulting composite structure may be continuously processed to form the carbon nanotube composite yarn. It is to be understood, however, that one or more stages may be performed separately in a continuous, batch, or semi-batch operation. For example, individual segments of carbon nanotube mats may be fed to the secondary particle chamber 111 for deposition of the particles thereon. The resulting composite structure may go through additional processing to evenly distribute the particles throughout the carbon nanotube mat.

The present disclosure is also directed to carbon nanotube composite yarns prepared according to the method described herein. The carbon nanotube composite yarn may comprise carbon nanotubes as described herein having secondary particles as described herein deposited thereon.

The present disclosure is also directed to devices comprising the carbon nanotube composite yarns prepared according to the method described herein. For example, the device may comprise an electrode (such as an electrode for a battery), a supercapacitor, a solar cell, a thermoelectric material, a sensor, an actuator, an element of an electronic device, an interconnect, or an E-textile, among others.

According to some aspects, the device may comprise a coaxial cable having at least two electrodes, and separator layer between them in some cases (e.g., in the use of liquid electrolyte) wherein at least one of the electrodes comprises a carbon nanotube composite yarn as disclosed herein. According to some aspects, at least two of the electrodes each comprises a carbon nanotube composite yarn as disclosed herein. The coaxial cable may further comprise an electrolyte, an insulating layer, and a conducting layer.

Figure 5:
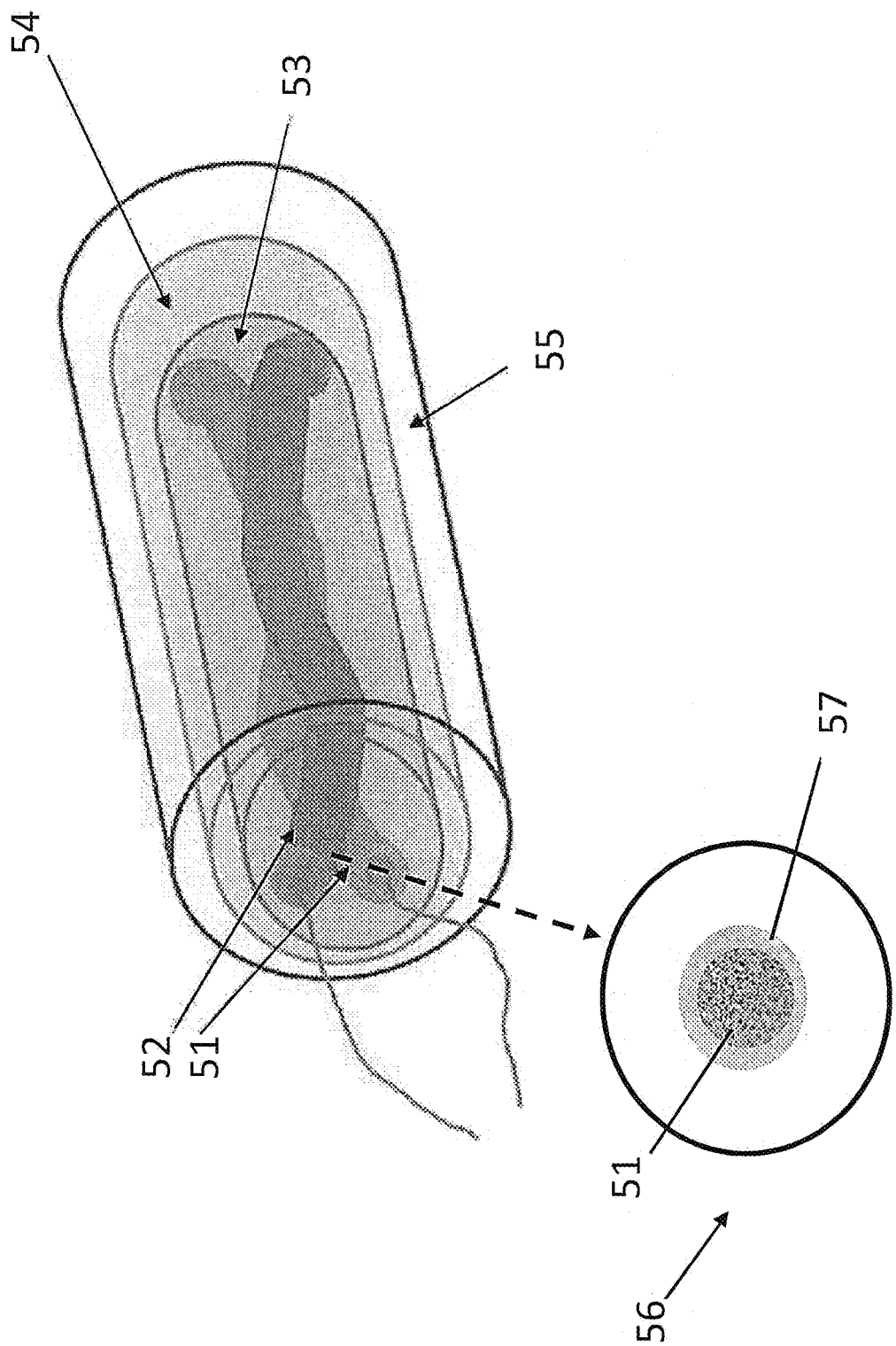
FIG. 5 shows an example coaxial cable that includes battery electrodes, according to aspects of the present disclosure.

FIG. 5 shows an example coaxial cable according to aspects of the present disclosure. In particular, FIG. 5 shows a coaxial cable having a first electrode 51 (e.g., an anode) and a second electrode 52 (e.g., a cathode), wherein each of the first and second electrodes individually comprises a carbon nanotube composite yarn as disclosed herein. For example, the first electrode 51 may comprise a carbon nanotube composite yarn wherein the secondary material comprises graphite flakes, and the second electrode 52 may comprise a carbon nanotube composite yarn wherein the secondary material comprises Li-Me-O particles.

According to some aspects, the coaxial cable may comprise the first electrode 51 and the second electrode 51 in a twisted configuration, for example, as shown in FIG. 5. As shown in FIG. 5, a twisted configuration may refer to a configuration wherein the first electrode 51 and the second electrode 52 are wrapped around one another and separated from each other by a separator (e.g., nafion). For example, FIG. 5 shows an expanded view 56 of the first electrode 51, which includes a carbon nanotube composite yarn as described herein. The first electrode 51 may be surrounded by a separator 57 as described herein. It should be understood that the second electrode 52 may have a similar configuration. According to some aspects, the first electrode 51 and the second electrode 52 are not in direct contact with each other.

The coaxial cable may further comprise an electrolyte (liquid, gel, or solid) 53 substantially surrounding the first electrode 51 and the second electrode 51, an insulating layer 54 substantially surrounding the electrolyte 53, and a conducting layer 55 substantially surrounding the insulating layer 54.

Materials useful for the electrolyte include, but are not limited to, mixtures of alkyl carbonates (e.g., ethylene carbonate (EC), dimethyl (DMC), diethyl (DEC), and ethylmethyl carbonates (EMC)) and $LiPF_6$ as the electrolyte solution as well as gel and solid electrolytes.

Materials useful for the insulating layer include, but are not limited to, non-conductive materials such as polymer-based materials. Example non-conductive polymer-based materials include plastics such as polyethylene.

Materials useful for the conducting layer include, but are not limited to, materials capable of conducting AC current such as copper, nickel, aluminum, and alloys thereof. In one example, the conducting layer 54 comprises copper. It should be understood that the thickness of the conducting layer 54 may be selected based on the frequency of exploited AC current. According to some aspects, the thickness of the conducting layer may be between about 1 µm to about 10 mm.

It should be understood that the coaxial cable according to the present disclosure, for example, as shown in FIG. 5, may function as both a conductor for AC current (e.g., for use in an electrical vehicle motor) and a battery. In particular, at least the first electrode, the second electrode, and the electrolyte may together provide energy while the conducting layer may transmit electrical current.

Figure 6A:
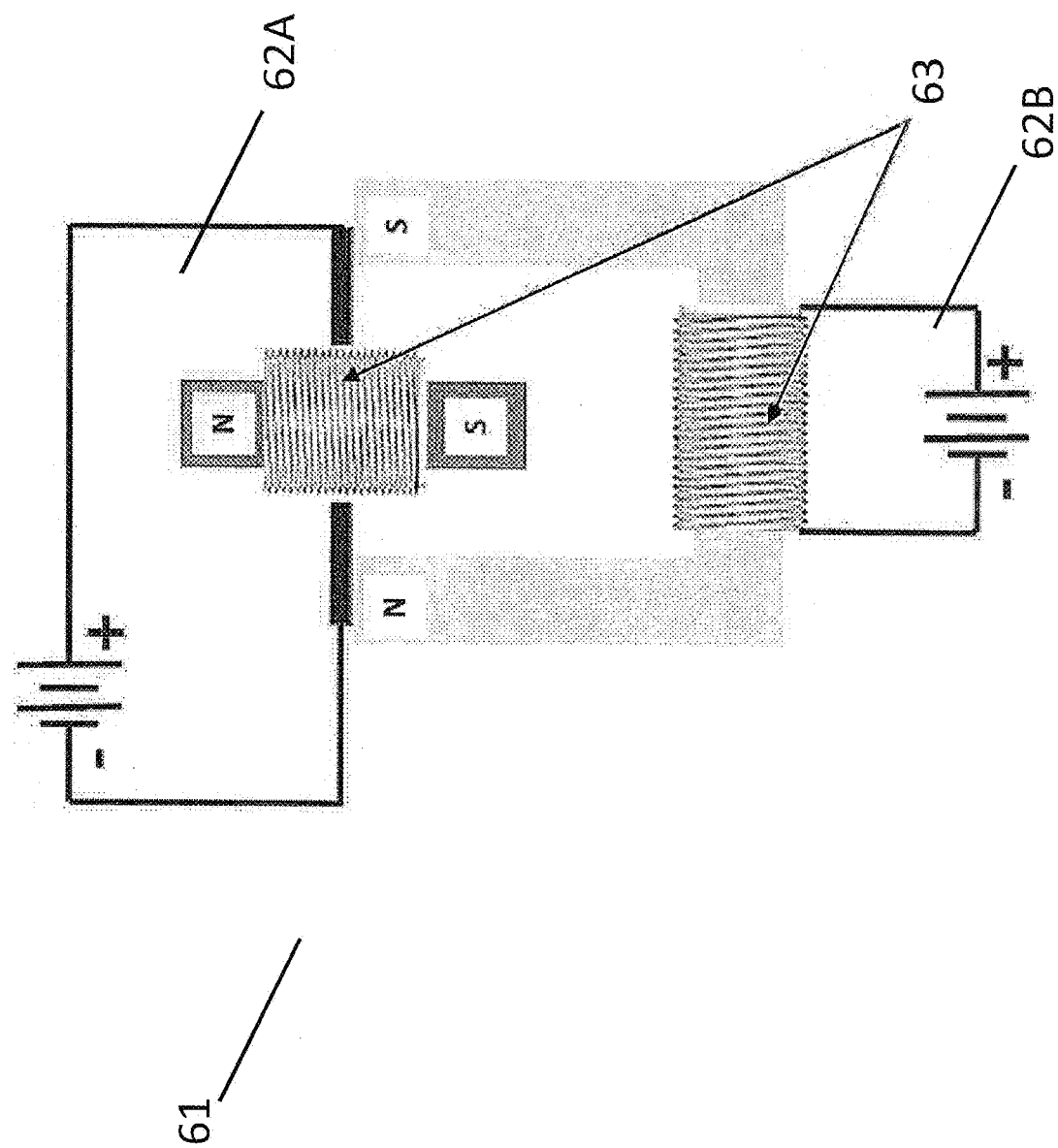
FIG. 6A shows a conventional electrical motor powered by an external battery.

According to some aspects, the device comprises an electronic incorporating the coaxial cable as described herein, including, for example, an electrical vehicle motor. It should be understood that conventional electrical vehicle motors, such as the electrical motor 61 shown in FIG. 6A, generally require external batteries 62A and 62B to create torque via induced electromagnetic fields. As shown in FIG. 6A, such electrical motors generally comprise copper coils 63, which transmit electrical current that generates a magnetic field and/or which accumulate electrical current induced by an external magnetic field.

Figure 6B:
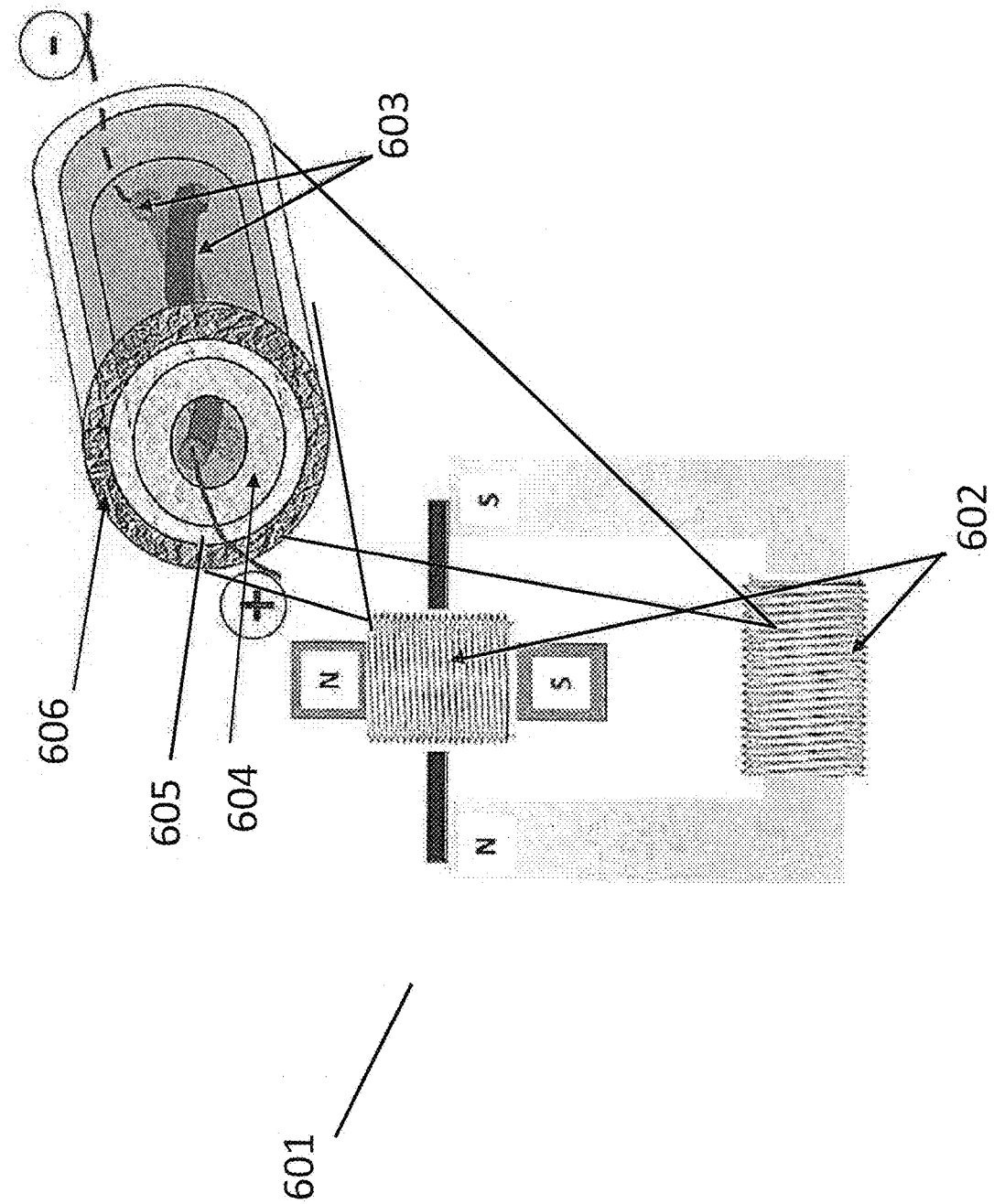
FIG. 6B shows an electrical motor powered by a multifunctional coaxial cable that accommodates a battery in the core, according to aspects of the present disclosure.

FIG. 6B shows one aspect of the present disclosure, specifically an electrical motor 601. As shown in FIG. 6B, electrical vehicle motor 601 may include one or more coaxial coils 602 in place of one or more of the copper coils 63 generally provided in conventional electrical vehicle motors (as shown, for example, in FIG. 6A). The one or more coaxial coils 602 may comprise a coaxial coil having a configuration as described, for example, in relation to FIG. 5. In particular, the coaxial coil may comprise two electrodes 603 in a twisted configuration, an electrolyte 604, an insulating layer 605, and a conducting layer 606, as described in relation to FIG. 5. According to some aspects, the coaxial coils 601 may be configured to both transmit electrical current and partially or completely power the electrical vehicle motor 601, thereby reducing or eliminating the need for an external battery (for example, external batteries 62A and 62B shown in FIG. 6A).

The present disclosure is also directed to methods of using the carbon nanotube composite yarns prepared according to the method described herein. For example, the method may comprise preparing a device as described herein comprising the carbon nanotube composite yarns. For example, the method may comprise weaving the carbon nanotube composite yarns to provide an E-textile.

In another example, the method may comprise preparing a coaxial cable as described herein. For example, the method may comprise providing a first electrode (e.g., an anode) and a second electrode (e.g., a cathode) in a twisted configuration and separated by separator, wherein each of the first and second electrodes individually comprises a carbon nanotube composite yarn as disclosed herein. The method may further comprise providing an electrolyte surrounding the first and second electrodes, providing an insulating layer surrounding the electrolyte, and providing a conducting layer surrounding the insulating layer.

This detailed description uses examples to present the disclosure, including the preferred aspects and variations, and also to enable any person skilled in the art to practice the disclosed aspects, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims. Aspects from the various embodiments described, as well as other known equivalents for each such aspect, can be mixed and matched by one of ordinary skill in the art to construct additional embodiments and techniques in accordance with principles of this application.

While the aspects described herein have been described in conjunction with the example aspects outlined above, various alternatives, modifications, variations, improvements, and/or substantial equivalents, whether known or that are or may be presently unforeseen, may become apparent to those having at least ordinary skill in the art. Accordingly, the example aspects, as set forth above, are intended to be illustrative, not limiting. Various changes may be made without departing from the spirit and scope of the disclosure. Therefore, the disclosure is intended to embrace all known or later-developed alternatives, modifications, variations, improvements, and/or substantial equivalents.

Reference to an element in the singular is not intended to mean "one and only one" unless specifically so stated, but rather "one or more." All structural and functional equivalents to the elements of the various aspects described throughout this disclosure that are known or later come to be known to those of ordinary skill in the art are expressly incorporated herein by reference. Moreover, nothing disclosed herein is intended to be dedicated to the public.

Further, the word "example" is used herein to mean "serving as an example, instance, or illustration." Any aspect described herein as "example" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C.

As used herein, the term "about" and "approximately" are defined to being close to as understood by one of ordinary skill in the art. In one non-limiting embodiment, the term "about" and "approximately" are defined to be within 10%, preferably within 5%, more preferably within 1%, and most preferably within 0.5%.

What is claimed is:

1. A method of making a carbon nanotube composite yarn, the method comprising:
    growing floating carbon nanotubes in a reactor,
    forming a mat of carbon nanotubes from the floating carbon nanotubes in the reactor;
    a deposition step comprising depositing secondary particles from a secondary particle chamber on at least a portion of the mat of carbon nanotubes to provide a carbon nanotube composite mat, wherein the mat of carbon nanotubes is continuously fed from the reactor to the secondary particle chamber, and
    a densification step comprising densifying the carbon nanotube composite mat to provide a carbon nanotube composite yarn.

2. The method according to claim 1, wherein growing the floating carbon nanotubes comprises providing a carbon source and a catalyst and/or catalyst precursor to the reactor and heating the reactor.

3. The method according to claim 2, wherein:
    the carbon source is selected from the group consisting of a hydrocarbon, an alcohol, an ester, a ketone, an aromatic, an aldehyde, and combinations thereof;
    the catalyst is selected from the group consisting of a transition metal, a lanthanide metal, an actinide metal, and combinations thereof and
    the catalyst precursor is selected from the group consisting of a transition metal salt, a hydrate thereof, and combinations thereof.

4. The method according to claim 1, wherein the secondary particles are deposited on the at least the portion of the mat of carbon nanotubes as a powder.

5. The method according to claim 4, wherein the densification step comprises a spinning densification step wherein the carbon nanotube composite mat is spun through a rolling press to provide the carbon nanotube composite yarn.

6. The method according to claim 4, wherein the densification step comprises a liquid bath densification step wherein the carbon nanotube composite mat is subjected to a liquid bath comprising a solvent to provide the carbon nanotube composite yarn.

7. The method according to claim 1, wherein the deposition step comprises depositing the secondary particles on the at least the portion of the mat of carbon nanotubes via a carrier.

8. The method according to claim 7, wherein the deposition step and the densification step are performed simultaneously.

9. The method according to claim 8, wherein the carrier comprises a solvent.

10. The method according to claim 1, wherein the secondary particles comprise a secondary material selected from the group consisting of metals, metal oxides, ceramics, carbon- based materials, and combinations thereof.

11. The method of claim 1, wherein the carbon nanotube composite yarn comprises 10% (w/w) or less carbon nanotubes and 90% (w/w) or more secondary particles.

12. A method of making a composite yarn, the method comprising:
    providing a structure comprising a plurality of carbon nanotubes in a reactor;
    a deposition step comprising continuously feeding the structure from the reactor to a secondary particle chamber in order to deposit particles on the structure to form a composite structure; and
    a densification step comprising densifying the composite structure to form a composite yarn.

13. The method according to claim 12, wherein the particles are deposited on the structure as a powder.

14. The method according to claim 13, wherein the densification step comprises a spinning densification step wherein the composite structure is spun through a rolling press to provide the composite yarn.

15. The method according to claim 13, wherein the densification step comprises a liquid bath densification step wherein the composite structure is subjected to a liquid bath comprising a solvent to provide the composite yarn.

16. The method according to claim 12, wherein the deposition step and the densification step are performed simultaneously.

17. The method according to claim 12, wherein the particles comprise a secondary material selected from the group consisting of metals, metal oxides, ceramics, carbon-based materials, and combinations thereof.

18. The method of claim 12, wherein the composite yarn comprises 10% (w/w) or less carbon nanotubes and 90% (w/w) or more particles.

19. A method of making a carbon nanotube composite yarn, the method comprising:
    providing a web of carbon nanotubes in a reactor;
    continuously feeding the web of carbon nanotubes from the reactor to a secondary particle chamber in order to deposit secondary particles on at least a portion of the web of carbon nanotubes to form a composite web, and
    densifying the composite web to form a carbon nanotube composite yarn.

* * * * *